May 21, 1968

B. R. JOHNSON ETAL 3,383,840

DUST COLLECTING SYSTEM

Filed May 10, 1966

INVENTORS
BOB R. JOHNSON
ROBERT V. MC CABE

BY
Kane, Dalsimer, Kane + Smith

United States Patent Office 3,383,840
Patented May 21, 1968

3,383,840
DUST COLLECTING SYSTEM
Bob R. Johnson, Troy, and Robert V. McCabe, Elnora, N.Y., assignors, by mesne assignments, to Research-Cottrell, Inc., Bridgewater Township, N.J., a corporation of New Jersey
Filed May 10, 1966, Ser. No. 548,937
1 Claim. (Cl. 55—293)

ABSTRACT OF THE DISCLOSURE

There is provided herein a dust collecting device, a bag chamber containing a plurality of suspended filter bags and first and second passages formed in the chamber interconnected by a duct with valve means and air moving means whereby during the bag cleaning cycle air can be circulated through said passages, said duct and said chamber in a circular motion to shake said bags allowing materials in the fabric thereof to become dislodged and falling by gravity into an enclosure beneath said bags.

---

In general, the types of dust collectors to which this invention relates consist of a chamber having a series of the tubular filter elements or bags suspended therein. Each of the bags is closed at its upper end from which it is suspended from supports and open at its lower end where it is held in fixed position.

Air, gases or smoke to be filtered is brought into the chamber so that it enters the bags at the fixed lower open ends thereof. These fluids are induced to flow up into and through the walls of the filter bags along their entire lengths and are then exhausted from the chamber to the atmosphere or to a gas recovery system in the dust collecting systems presently known in the art. The dust or particles filtered from the fluids is held and collected by the bag walls in between the threads of which the bags are woven. After a length of time the bag walls become so clogged with accumulated dust that the filtering operation must be stopped to enable the bags to be cleaned. Generally there are means provided so that during the cleaning dust is loosened from the bags and allowed to fall through the open end of the bag to a hopper in the bottom of the chamber from which the dust can be removed.

One of the major difficulties in the filtering of air, gases or smoke with a system of this type is the removal of the dust or solid particles embedded in the filter cloth. The material embedded in the cloth can cause a binding, blinding, or clogging of the cloth which reduces the rate of filtering. In some cases there is a total blinding of the cloth.

The invention disclosed herein has as its principal object the employment of the air or gas present within the system for shaking the dust laden bags in order to clean them.

It is a further object of this invention to provide means for cleaning dust laden bags in a dust collecting system which does not require complete system shutdown or switching of units during the cleaning operation and to provide a system in which the dust laden air can still be fed into the silo or other enclosure during the cleaning portion of the cycle.

It is a further object of this invention to provide a dust collecting system which can be utilized with an inlet feed which is continuous, intermittent, or under pressure.

It is still a further object of this invention to provide a dust collecting system which will operate efficiently over long periods of time with a minimum of supervision and which will be relatively inexpensive and simple to install and maintain.

A dust collecting system constructed in accordance with the teachings of this invention and the method of using the same is disclosed herein with refereinces to the drawings, in which.

Figure 1:
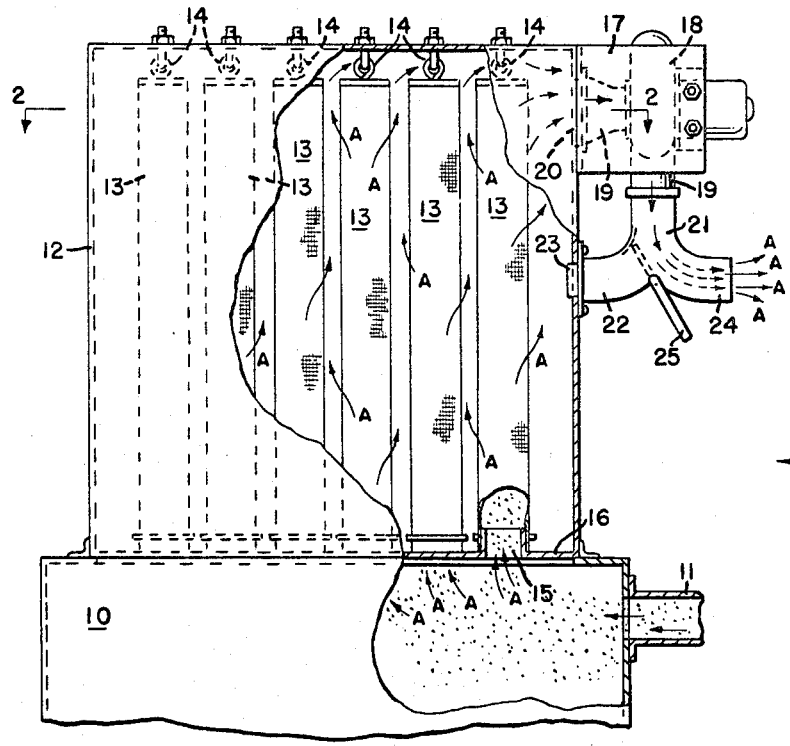
FIG. 1 is a side view of a dust collecting system constructed in accordance with the teachings of this invention during the filtering portion of the cycle with parts of the casing cut away in order to disclose inner details of construction.
Figure 2:
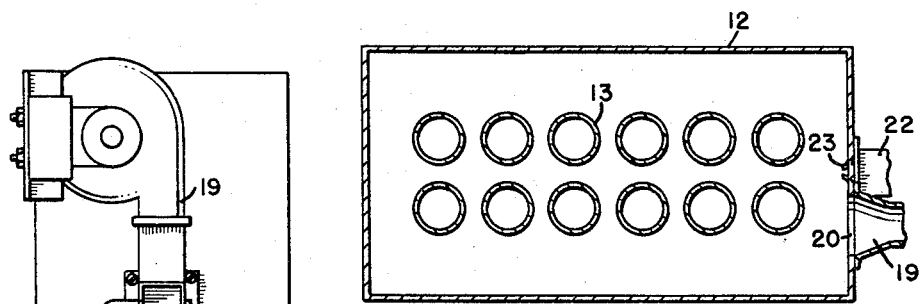
FIG. 2 is a sectional view taken along the line 2—2 in the direction of the arrows in FIG. 1.
Figure 3:
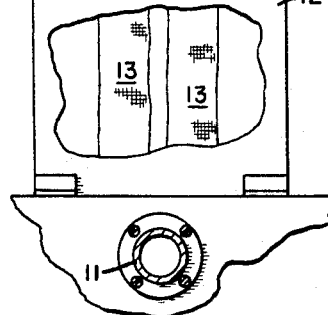
FIG. 3 is an end view of the system shown in FIG. 1 looking in the direction of the arrow designated by the numeral 3 in FIG. 1.

In order to illustrate the invention, an embodiment of the invention is shown in the figures in which silo 10 is a customers storage silo and it is fed with dust laden air through silo inlet feed system 11 which is a pneumatic conveying system of the type which is vented to atmosphere. This type silo inlet system has been selected in order to provide a simple illustration of the invention and, as will be seen below, a vaiety of silo systems can utilize the invention. The silo inlet feed, for example, can be continuous, intermittentt, or under pressure. Also, the silo itself can be under a positive or negative pressure. Other enclosures such as hoppers or bins, for example, can be used in place of silos. When the term silo is hereafter mentioned this intention shall be understood.

Bag chamber 12 which is airtight and designed to withstand a high positive or negative pressure is mounted on top of silo 10 with filter bags 13 suspended therein. The bags 13 are woven of suitable material and hung from the upper portion of the bag chamber with loose links 14. The lower ends of the bags are clamped into position by fitting over upwardly projecting cylindrical openings 15 in plate 16, which plate insures that the upwardly directed dust laden air enters the bags 13.

Figure 5:
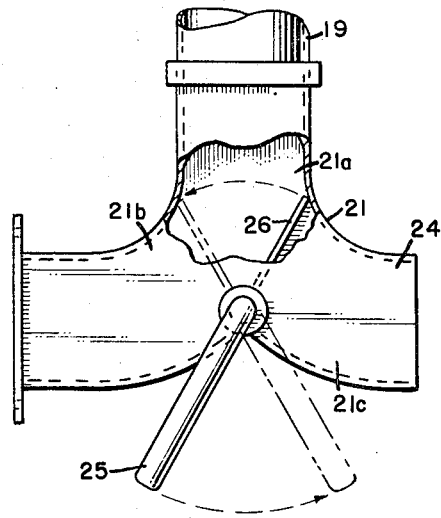
FIG. 5 is an enlarged view of the valve utilized in the system for selecting the cleaning or filtering portion of the cycle with portions of the outer casing of the valve cut away and with the cleaning position of the valve shown in full line and the filtering position of the valve shown in broken lines.

A mounting bracket 17 supports a system fan 18 which is operatively connected to outlet duct 19. Outlet duct 19 is operatively connected to the bag chamber through opening 20 therein. Duct 19 is operatively connected with valve 21 also which can direct air from duct 19 either into inlet duct 22 and into nozzle 23 in the wall of the bag chamber or into exhaust duct 24. The valve 21 is shown in enlarged view in FIG. 5 and is a 3-way valve having one inlet 21a and two outlets 21b and 21c, only one of which is in circuit with inlet 21a at a time. The outlet in circuit with inlet 21a is determined by the position of handle 25. In FIG. 5 the handle is in the position which would connect outlet 21b in circuit with inlet 21a since plate 26 which is pivotally mounted on housing 21 of the valve is blocking the passage between inlet 21a and outlet 21c. In FIG. 1 the valve is shown in the position directing air flowing therein to exhaust duct 24 since the plate 26 is blocking the passage between inlet 21a and outlet 21b.

Figure 4:
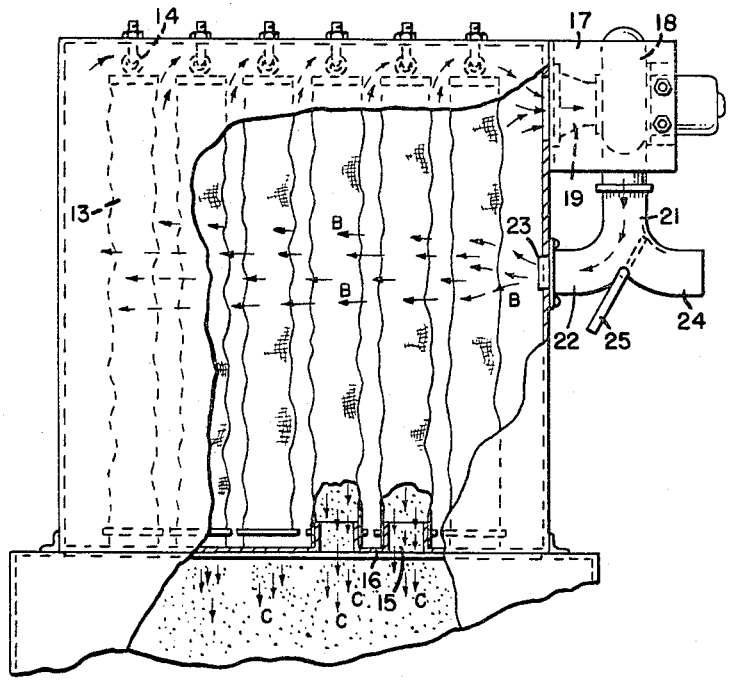
FIG. 4 is a side view similar to FIG. 1 during the cleaning portion of the cycle.

In operation, the dust laden air is blown or induced into silo 10 or other enclosure through inlet feed 11 and in the position of valve handle 25 shown in FIG. 1 the system fan 18 operating under negative pressure draws the cleaned air or gases out of the silo through the fabric dust bags and discharges the clean air to atmosphere or to other sources through exhaust 24. The arrows designated A indicate the flow of the air. The dust laden air, therefore, enters the lower portion of each of the bags at the opening 15, passes through the fabric of the bag and the clean filtered air is drawn by the system fan 18 out of the bag chamber and exhausted through exhaust duct 24. While this is happening the dust which is removed from the air is building up on the inner wall of each of the filter bags and becoming lodged in the woven bag structure. During this portion of the cycle which is referred to as the filtering portion of the cycle, the handle 25 of the valve is in the position shown in FIG. 1. When it is desired to remove dust from the bags the handle is rotated clockwise to the position shown in FIGS. 4 and 5 and during this period of dust removal, or bag cleaning, the valve discharges the air or gases back into the collector housing through nozzle 23 and between the rows of dust bags as indicated by the arrows designated B. This flow of air from nozzle 23 in the direction of the bags shakes the bags in a flapping action causing the dust from the side walls of the bags to fall back down into the silo 10 as indicated by the arrows designated C. This portion of the cycle wherein handle 25 of the valve is in the position shown in FIGS. 4 and 5 is referred to as the cleaning portion of the cycle and normally occupies about five percent of the total cycle of operation. During the cleaning cycle the system fan continues to operate however it cannot draw dust laden air from the silo since the closure by the valve creates a dead-end condition with respect to the silo and there is no flow of air or gases up through the fabric of the bags or out of the silo during the shaking of the bags. With one unit there would be no flow from the inlet feed system 11 since there is no venting to atmosphere. With multiple units flow from inlet feed system 11 would continue.

The entry of dust into the filter bags can also be from the top commonly known as a top entry collector in which each of the bags will be open at the top and open at the bottom. The principle of the collecting and the cleaning will remain the same as the presently shown bottom entry system.

The unique and simple design of this application operates on the principle of controlled air flow and therefore controlled dust flow because as air or gases flow so flows the dust.

Although a particular valve is shown in this embodiment, other valves can be used since all that is required is a valve, or system of valves, with one inlet and two outlets operated either manually or automatically.

Thus, among others, the several objects of the invention, as specifically aforenoted, are achieved. Obviously, numerous changes in construction and rearrangement of the parts might be resorted to without departing from the spirit of the invention as defined by the claim.

We claim:
1. In a dust collecting system consisting of a bag chamber, a plurality of filter bags suspended within said chamber in parallel disposed relationship with their longitudinal axes substantially vertical, closed tops of said bags, open bottoms of said bags, a dust enclosure beneath said chamber, a horizontal plate separating said dust enclosure from said chamber, a plurality of openings in said plate allowing communication of the interior of respective bags through said open ends thereof with said dust enclosure, an opening in the side wall of said chamber, nozzle means provided in said bag chamber in the side wall thereof in a zone intermediate the tops and bottoms of said filter bags and between said opening and said horizontal plate, that improvement consisting of providing a mounting bracket outside of said bag chamber, mounted thereon adjacent said opening and above said nozzle means, a fan supported by said mounting bracket, an inlet to said fan, a first duct connecting said fan inlet and said opening, an outlet of said fan, a three way valve outside of said bag chamber and mounted on the side wall of said bag chamber adjacent said nozzle means, an inlet of said valve connected to the outlet of said fan, a first outlet of said valve connected to said nozzle means, a second outlet of said valve opening to atmosphere, a valve plate of said valve pivotally supported within said valve, a bag cleaning position of said valve plate blocking said second outlet and allowing air drawn from said chamber by said fan to pass through said valve inlet, said first valve outlet and said nozzle means to impinge upon said bags, a filtering position of said valve plate blocking said first outlet and allowing air drawn from said chamber by said fan to pass through said valve inlet and said second valve outlet to be exhausted to atmosphere and handle means for pivotally moving said valve plate between said bag cleaning and said filtering positions.

References Cited

UNITED STATES PATENTS

| | | | |
|---|---|---|---|
| 1,538,292 | 5/1925 | Lindsay | 55—303 |
| 1,617,072 | 2/1927 | Matlock. | |
| 2,732,912 | 1/1956 | Young | 55—293 X |
| 2,792,074 | 5/1957 | Schilb et al. | 55—341 X |
| 2,821,262 | 1/1958 | Godwin | 210—333 X |
| 2,836,256 | 5/1958 | Caskey | 55—303 X |
| 2,964,129 | 12/1960 | Labbe | 55—293 X |
| 3,078,646 | 2/1963 | Leech et al. | 55—293 X |
| 3,146,080 | 8/1964 | Rubble et al. | 55—302 X |

FOREIGN PATENTS

| | | |
|---|---|---|
| 518,461 | 2/1931 | Germany. |
| 708,919 | 7/1941 | Germany. |
| 514,140 | 10/1939 | Great Britain. |
| 939,641 | 10/1963 | Great Britain. |

OTHER REFERENCES

"Air Filter," Chemical Engineering, July 5, 1965, class 55–302.

Kraus, Milton N. "Pneumatic Conveying," Chemical Engineering, May 10, 1965, page 156 only, class 55–341.

HARRY B. THORNTON, *Primary Examiner.*

D. TALBERT, *Assistant Examiner.*